United States Patent Office 3,686,181
Patented Aug. 22, 1972

3,686,181
QUINOXALINE-DI-N-OXIDE-LACTONES
AND THEIR PRODUCTION
Kurt Ley, Odenthal-Globusch, Ulrich Eholzer, Cologne-Stammheim, and Florin Seng, Cologne-Buchheim, Germany, assignors to Farbenfabriken Bayer Aktiengesellschaft, Leverkusen, Germany
No Drawing. Filed Oct. 29, 1969, Ser. No. 872,384
Claims priority, application Germany, Nov. 8, 1968,
P 18 07 735.5
Int. Cl. C07d 51/78
U.S. Cl. 260—250 R          10 Claims

ABSTRACT OF THE DISCLOSURE

New quinoxaline-di - N - oxide-lactones having antifungal activity are provided which are prepared from a 2 - acyloxy-methyl-3-carboxamido-quinoxaline - di - N-oxide-(1,4) starting material by reaction with an inorganic or organic acid at a temperature of 0° to 100° C. in a diluent.

---

The present invention relates to certain new quinoxaline-di-N-oxide-lactones and to a process for their production and to antifungal active compositions containing said lactones.

The present invention provides quinoxaline-di-N-oxide-lactones of the formula:

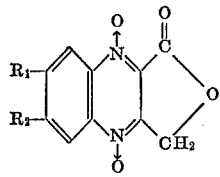

(I)

in which $R_1$ and $R_2$ may be the same or different and are each hydrogen, lower alkyl or halogen.

The invention also provides a process for the production of a lactone of Formula I which comprises reacting a 2-acyloxy-methyl-3-carboxamido-quinoxaline - di - N-oxide-(1,4) of the formula:

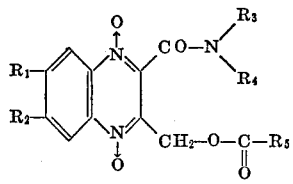

(II)

in which:

$R_1$ and $R_2$ have the above meaning, $R_3$ and $R_4$ may be the same or different and are each hydrogen, an unsubstituted or substituted aliphatic radical, an unsubstituted or substituted aromatic radical, or when $R_3$ and $R_4$ are both aliphatic, they together may form part of a 5- or 6-membered heterocyclic ring system, and $R_5$ is an unsubstituted or substituted aliphatic or aromatic radical, in a diluent with at least the theoretically required amount of an inorganic or organic acid, within a temperature range of 0° to 100° C.

When $R_1$ and $R_2$ are lower alkyl, they usually have 1 to 8, preferably 1 to 4, carbon atoms.

When $R_3$ and $R_4$ are aliphatic radicals, they are usually straight-chain or branched alkyl radicals with up to 18, preferably up to 12, but more particularly 1 to 4, carbon atoms, or cycloaliphatic radicals with 5 to 12, preferably 5 or 6, carbon atoms in the ring system, and any substituents in the aliphatic radicals are preferably hydroxy, lower alkoxy, lower carbalkoxy or mono- or di-alkylamino groups, the last-mentioned containing up to a total of 8 carbon atoms.

When $R_3$ and $R_4$ are aromatic radicals, they usually contain up to 10, preferably up to 6, carbon atoms in the ring system. Preferred substituents (up to a maximum of 3) include lower alkyl radicals and halogens (preferably fluorine, chlorine and bromine). When $R_3$ and $R_4$, together with the nitrogen atom, form a heterocyclic ring system, they may be substituted by lower alkyl radicals preferably having 1 or 2 carbon atoms. This ring system may also contain as further hetero atoms an oxygen atom or a nitrogen atom substituted by a lower alkyl radical.

When $R_5$ is an aliphatic radical, it usually contains from 1 to 6, preferably 1 or 2, carbon atoms, or it may be a cyclohexyl radical. Suitable substituents of these aliphatic radicals include the halogens (preferably fluorine, chlorine or bromine), hydroxy, lower alkoxy preferably having 1 to 4 carbon atoms, or phenyl. When $R_5$ is an aryl radical it usually contains up to 10, preferably up to 6, carbon atoms in the ring system. Preferred substituents (up to a maximum of 3) include hydroxy, lower alkyl and halogen, the preferred substituents having the same meaning as above.

When 2-acetoxymethyl-3 - carboxylic acid-dimethyl-amidoquinoxaline-di-N-oxide-(1,4) is used as the starting compound of Formula II, and hydrochloric acid is used as the acid, the course of the reaction can be illustrated by the following reaction scheme:

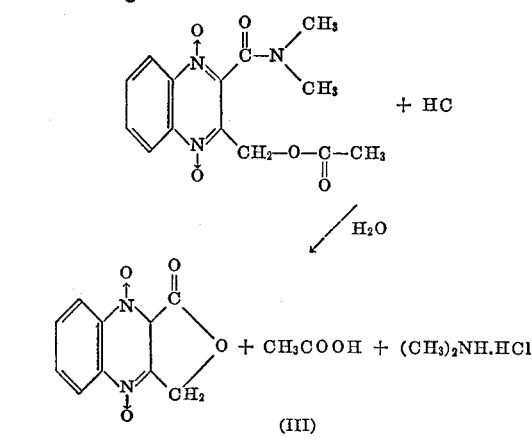

(III)

The starting compounds used for the process according to the invention can be obtained by earlier known methods.

Examples of suitable starting compounds include the following:

2-acetoxymethyl-3-carbonamido-quinoxaline-di-N-oxide-(1,4)

2-acetoxymethyl-3-carboxylic acid methylamindo-quinoxaline-di-N-oxide-(1,4)

2-acetoxymethyl-3-carboxylic acid-ethylamido-quinoxaline-di-N-oxide-(1,4)

2-acetoxymethyl-3-carboxylic acid-dimethylamido-quinoxaline-di-N-oxide-(1,4)

2-acetoxymethyl-3-piperidino-carbonyl-quinoxaline-di-N-oxide-(1,4)

2-acetoxymethyl-3-carboxylic acid-diethylamido-quinoxaline-di-N-oxide-(1,4)

2-acetoxymethyl-3-morpholino-carbonyl-quinoxaline-di-N-oxide-(1,4)

2-acetoxymethyl-3-carboxylic acid-anilido-quinoxaline-di-N-oxide-(1,4)

2-benzoyl-oxymethyl-3-carboxylic acid-methylamido-quinoxaline-di-N-oxide-(1,4)

2-(2'-hydroxy-benzyol)-oxymethyl-3-carboxylic acid-β-methoxyethylamido-quinoxaline-di-N-oxide-(1,4).

Inorganic or organic acids useful for the process are those whose dissociation constant lies within the range of about $10^9$ to about $10^{-5}$. Examples of organic acids include benzene sulphonic acid, toluene sulphonic acid, and alkyl sulphonic acids with up to 6 carbon atoms. Halogen hydracids, sulphuric acid or nitric acid may be used. Sulphuric acid, hydrobomic acid and hydrochloric acid are especially preferred; the latter may be used in the anhydrous form, if desired.

Water, alcohols of 1 to 4 carbon atoms, tetrahydrofuran, dioxan and acetic acid are examples of suitable diluents.

At least one mol of acid is used for each mol of 2-acyloxy-methyl-3-carboxylic acid amindo-quinoxaline-di-N-oxide.

The reaction according to the invention may preferably be carried out as follows: One mol of 2-acyloxymethyl-3-carboxylic acid-amido-quinoxaline-di-N-oxide-(1,4) is dissolved or suspended in one of the above-mentioned diluents, 1 to 20 mols of acid are added and the mixture is stirred at a temperature from 0° to 100° C., preferably 20° to 80° C. When operating in organic solvents, the new lactones are precipitated in crystalline form after a short time from the solutions obtained. When operating in water, the reaction is carried out in a suspenson.

The substances obtained by the process of the invention can be isolated in conventional manner as by filtration.

The new quinoxaline-di-N-oxide lactones of the present invention are useful for their antifungal activity. In particular, the compounds of the present invention have been found to inhibit fungi in in virto tests. They are thus useful in protecting such organic materials as wood, paper, leather and the like from fungal attack.

Compound IV which is representative of the compounds of the present invention was tested for antifungal activity in vitro (see Example 3).

The invention is illustrated by the following non-limitative examples.

EXAMPLE 1

29.1 g. (0.1 mol) of 2-acetyloxymethyl-3-carboxylic acid-methylamido-quinoxaline-di-N-oxide-(1,4) are introduced into 100 ml. of methanol containing 10 g. of 37% hydrochloric acid, and the mixture is heated at 80° C. for 5 minutes. The starting product dissolves and, after a short time, the lactone of the formula:

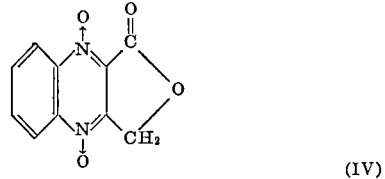

(IV)

separates in the form of yellow crystals which, after redissolving from dimethylformamide, melt at 207° C. with decomposition. Yield: 15.5 g. (71% of theory).

Analysis.—$C_{10}H_6N_2O_4$ (mol. weight 218). Calculated (percent): C, 55.2; H, 2.78; N, 12.85; O, 29.4. Found (percent): C, 55.6; H, 3.0; N, 12.80; O, 28.4.

The 2-acethyloxymethyl-3-carboxylic acid-methylamido-quinoxaline-di-N-oxide-(1,4) used in Example 1 as starting material was obtained as follows:

26.7 g. (0.1 mol) of 2-chloromethyl-3-carboxylic acid-methylamido-quinoxaline-di-N-oxide-(1,4) are suspended in 100 ml. of ethanol and mixed with 16.4 g. (0.2 mol) of sodium acetate dissolved in 40 ml. of water. The mixture is heated at 70° C. for 5 hours and subsequently cooled to 0° to 5° C. 17 g. (58.4% of theory) of yellow crystals of 2-acetyloxymethyl-3-carboxylic acid-methylamido-quinoxaline-di-N-oxide- (1,4) are precipitated which, after redissolving from acetonitrile, melt at 167–169° C. The other starting compounds used for the process can be obtained in analogous manner.

EXAMPLE 2

30.6 g. (0.1 mol) of 2-acetyloxymethyl-3-carboxylic acid-dimethylamido-quinoxaline-di-N-oxide-(1,4) are suspended in 75 ml. of 37% aqueous hydrochloric acid and the suspension is heated to 80° C. The resultant red slurry is mixed after 5 minutes with 200 ml. of water, the color of the suspension turning to yellow. After cooling and suction-filtration, 17 g. (81.6% of theory) of the compound described in Example 1 are obtained. After redissolving from dimethylformamide, the lactone melts at 207° C. with decomposition.

In analogous manner, the following compounds were prepared:

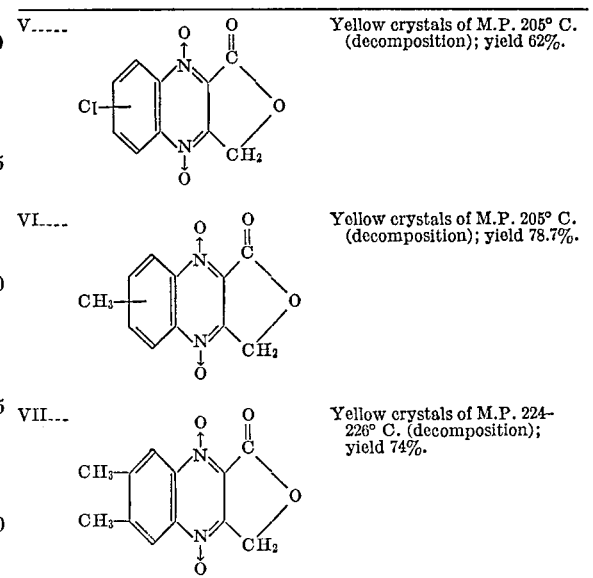

V — Yellow crystals of M.P. 205° C. (decomposition); yield 62%.

VI — Yellow crystals of M.P. 205° C. (decomposition); yield 78.7%.

VII — Yellow crystals of M.P. 224–226° C. (decomposition); yield 74%.

EXAMPLE 3

Compound IV was tested in vitro for activity against Aspergillus terreus and Candida albicans. Cultures of Aspergillus terreus and Candida albicans were prepared and a drop of each culture was added to 10 ml. of a carbohydrate containing agar nutrient medium in order to make up one test culture containing each organism.

A cellulose platelet 1 cm. in diameter was dipped into a 1% solution of compound IV, dissolved in dimethyl formamide and one such platelet was then placed in each of the above nutrient medium containing the active organism. After incubation at a temperature of 30° C. for 72 hours the zone of inhibition for each organism was measured and the radius of each zone of inhibition was found to be 2 mm.

This zone of inhibition is indicative of activity for compound IV which is representative of the compound of the present invention (against Aspergillus terreus and Candida albicans).

What is claimed is:

1. A quinoxaline-di-N-oxide-lactone of the formula:

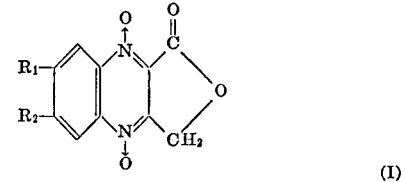

(I)

in which:

$R_1$ and $R_2$ are the same or different and are each hydrogen, lower alkyl or chlorine.

2. A compound of claim 1 in which $R_1$ and $R_2$ are lower alkyl having 1–4 carbon atoms.

3. The compound of claim 1 which is:

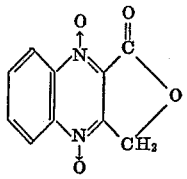

(IV)

4. The compound of claim 1 which is:

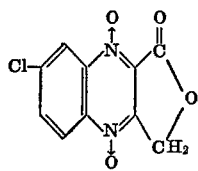

(V)

5. The compound of claim 1 which is:

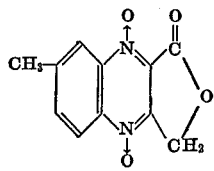

(VI)

6. The compound of claim 1 which is:

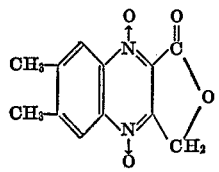

(VII)

7. A process for the production of a compound of claim 1 which comprises reacting 2-acyloxy-methyl-3-carboxamido-quinoxaline - di - N - oxide-(1,4) of the formula:

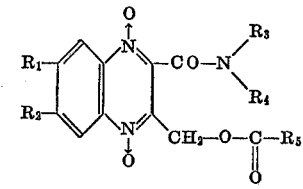

(II)

in which $R_1$ and $R_2$ are the same or different and are each hydrogen, lower alkyl or chlorine, $R_3$ and $R_4$ when taken independently are the same or different and are each hydrogen, alkyl of up to 12 carbon atoms, cycloalkyl of 5 to 6 carbon atoms, said alkyl and cycloalkyl being unsubstituted or substituted by hydroxy, lower alkoxy, lower carbalkoxy, lower alkylamino or dilower alkylamino, or an aromatic ring of up to 10 carbon atoms, said aromatic ring being unsubstituted or substituted by from 1 to 3 substituents selected from the group consisting of lower alkyl, fluoro, chloro or bromo, or when $R_3$ and $R_4$ are taken together with the nitrogen to which they are attached a 5- or 6-membered heterocyclic ring, and $R_5$ is methyl, ethyl or cyclohexyl, said groups unsubstituted or substituted by fluoro, chloro, bromo, hydroxy, lower alkoxy or phenyl, or substituted by from 1 to 3 substituents selected from the group consisting of hydroxy, lower alkyl, fluoro, chloro or bromo, in a diluent with at least the theoretically required amount of an inorganic or organic acid having a dissociation constant of from about $10^9$ to $10^{-5}$ at a temperature of from $0°$ to $100°$ C.

8. A process according to claim 7 in which the acid is a sulphonic acid or a hydrohalic acid.

9. A process according to claim 7 in which the diluent is water, an alcohol with 1–4 carbon atoms, tetrahydrofuran, dioxan or acetic acid.

10. A process according to claim 7 in which the reaction takes place at 20–80° C.

References Cited

UNITED STATES PATENTS 3,479,354   11/1969   Galt _____ 260—250 R

NICHOLAS S. RIZZO, Primary Examiner

U.S. Cl. X.R.

424—250; 260—247.2 B